US009841624B2

(12) United States Patent
Jepsen et al.

(10) Patent No.: US 9,841,624 B2
(45) Date of Patent: Dec. 12, 2017

(54) CONFIGURATIONS FOR TILEABLE DISPLAY APPARATUS WITH MULTIPLE PIXEL ARRAYS

(71) Applicant: X Development LLC, Mountain View, CA (US)

(72) Inventors: Mary Lou Jepsen, Sausalito, CA (US); Carlin Vieri, Menlo Park (CA); John Ryan, Sausalito, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/486,135

(22) Filed: Apr. 12, 2017

(65) Prior Publication Data

US 2017/0219864 A1    Aug. 3, 2017

Related U.S. Application Data

(62) Division of application No. 14/145,747, filed on Dec. 31, 2013, now abandoned.

(Continued)

(51) Int. Cl.
  *G02F 1/1333*  (2006.01)
  *G02F 1/133*   (2006.01)
  *G02F 1/1335*  (2006.01)

(52) U.S. Cl.
  CPC ...... *G02F 1/13336* (2013.01); *G02F 1/13306* (2013.01); *G02F 1/133504* (2013.01); *G02F 1/133603* (2013.01)

(58) Field of Classification Search
  CPC ............. G02F 1/13336; G02F 1/13306; G02F 1/133504; G02F 1/133603; G02F 1/1336;

(Continued)

(56) References Cited

U.S. PATENT DOCUMENTS 5,889,568 A    3/1999   Seraphim et al.
6,005,649 A    12/1999  Krusius et al.
(Continued)

FOREIGN PATENT DOCUMENTS

GB    2373620 A  *  9/2002  ....... G02F 1/133617
JP    2007519330 A    7/2007
(Continued)

OTHER PUBLICATIONS

TW 103122688—First Taiwan Office Action with English translation, dated Jul. 28, 2015, 11 pages.
(Continued)

*Primary Examiner* — Edward Glick
*Assistant Examiner* — Shan Liu
(74) *Attorney, Agent, or Firm* — Christensen O'Connor Johnson Kindness PLLC

(57) ABSTRACT

A display including a screen layer for displaying a unified image to a viewer on a viewing side of the screen layer that is opposite a backside of the screen layer, and an illumination layer having an array of light sources. Each light source in the array is configured to emit a divergent projection beam having a limited angular spread. A display layer is disposed between the screen layer and the illumination layer, and includes a matrix of pixlets, a spacing region disposed between the pixlets in the matrix, wherein the array of light sources are positioned to emit the divergent projection beams having limited angular spread to project sub-images displayed by the pixlets as magnified sub-images on the backside of the screen layer, the magnified sub-images to combine to form a substantially seamless unified image, and one or more components positioned on the display layer in the spacing region.

20 Claims, 9 Drawing Sheets

Related U.S. Application Data

(60) Provisional application No. 61/856,461, filed on Jul. 19, 2013.

(58) Field of Classification Search
CPC ........ G02F 2001/133607; G02F 2001/133616; G02F 1/133606; G02F 1/1347; G02F 1/0121; G02F 1/0327; G02F 1/076; G02F 1/133; G02F 1/1345; G02F 1/13452; G02F 1/13454; G02F 1/13458; G02F 2001/133388; G02F 2001/133612; G02F 2001/13456; G03B 21/006; G03B 21/132; H04N 9/3102; H04N 9/3105; H04N 9/3197; H04N 9/3108; G02B 27/01; G02B 27/0101; G02B 27/017; G02B 27/0172; G02B 2027/0112; G02B 5/30; G09G 2300/0426; G09G 2300/0408; G09G 3/3655; G09G 3/3674; G09G 3/3685; G09G 2290/00; H01L 23/48; H01L 23/49572; H01L 2224/50; H01L 2224/79; H01L 2224/86; H01L 2225/06579; H01L 2225/107; H01L 24/50
USPC ......... 349/5–10, 11, 61–64, 73–74, 149–152
See application file for complete search history.

(56) References Cited

U.S. PATENT DOCUMENTS

| | | | |
|---|---|---|---|
| 6,377,306 | B1 | 4/2002 | Johnson et al. |
| 6,727,864 | B1 | 4/2004 | Johnson et al. |
| 7,029,124 | B2 | 4/2006 | Dubin et al. |
| 7,145,611 | B2 | 12/2006 | Dubin et al. |
| 7,239,367 | B2 | 7/2007 | Jin et al. |
| 7,339,625 | B2 | 3/2008 | Matthys et al. |
| 7,495,638 | B2 | 2/2009 | Lamvik et al. |
| 7,738,036 | B2 | 6/2010 | Nijim et al. |
| 7,742,120 | B2 | 6/2010 | Bayley et al. |
| 7,744,289 | B2 | 6/2010 | Hu |
| 9,030,375 | B2 | 5/2015 | Curtis et al. |
| 9,123,266 | B2 | 9/2015 | Bastani et al. |
| 9,336,729 | B2 | 5/2016 | Jepsen |
| 2002/0080302 | A1 | 6/2002 | Dubin et al. |
| 2003/0117545 | A1 | 6/2003 | Coker et al. |
| 2003/0184703 | A1 | 10/2003 | Greene et al. |
| 2004/0130503 | A1 | 7/2004 | Hamagishi et al. |
| 2006/0012733 | A1 | 1/2006 | Jin et al. |
| 2006/0055864 | A1 | 3/2006 | Matsumura |
| 2006/0097957 | A1 | 5/2006 | Ben-Shalom |
| 2006/0227085 | A1 | 10/2006 | Boldt et al. |
| 2009/0225396 | A1 | 9/2009 | Sampsell |
| 2009/0278121 | A1* | 11/2009 | Kakkad ............... G02F 1/13318 257/43 |
| 2009/0322649 | A1* | 12/2009 | Hamer .................. G09G 3/20 345/1.3 |
| 2010/0177261 | A1 | 7/2010 | Jin et al. |
| 2010/0265160 | A1 | 10/2010 | Hajjar |
| 2010/0265723 | A1 | 10/2010 | Zhou |
| 2010/0319847 | A1* | 12/2010 | Cok ........................ H01L 24/27 156/272.8 |
| 2011/0102365 | A1* | 5/2011 | Park ....................... G06F 3/0412 345/174 |
| 2011/0148835 | A1* | 6/2011 | Yamazaki ........... G02F 1/13318 345/207 |
| 2013/0082936 | A1 | 4/2013 | Islamkulov et al. |
| 2013/0093646 | A1 | 4/2013 | Curtis et al. |
| 2015/0022727 | A1 | 1/2015 | Jepsen |
| 2015/0023051 | A1 | 1/2015 | Jepsen |
| 2015/0097837 | A1 | 4/2015 | Jepsen et al. |
| 2015/0097853 | A1 | 4/2015 | Bastani et al. |
| 2015/0153023 | A1 | 6/2015 | Jepsen et al. |
| 2015/0301689 | A1* | 10/2015 | Harada ................. G06F 3/0412 345/175 |

FOREIGN PATENT DOCUMENTS

| | | |
|---|---|---|
| KR | 10-2006-0040166 | 5/2006 |
| TW | 200306512 A | 11/2003 |
| TW | 200504634 A | 2/2005 |
| TW | 201018992 A | 5/2010 |
| TW | 2010033959 A | 9/2010 |
| TW | 201118029 A | 6/2011 |

OTHER PUBLICATIONS

TW 103122692, First Taiwan Office Action with English translation, dated Jul. 29, 2015, 12 pages.
TW 103122691, First Taiwan Office Action with English translation, dated Jan. 20, 2016, 15 pages.
PCT/US2014/042708, International Search Report and Written Opinion of the International Searching Authority, dated Oct. 28, 2014, 12 pages.
PCT/US2014/042710, International Search Report and Written Opinion of the International Searching Authority, dated Oct. 28, 2014, 11 pages.
PCT/US2014/042552, International Search Report and Written Opinion of the International Searching Authority, dated Oct. 28, 2014, 10 pages.
PCT/US2014/042708, International Preliminary Report on Patentability, dated Jan. 28, 2016, 9 pages.
PCT/US2014/042710, International Preliminary Report on Patentability, dated Jan. 28, 2016, 10 pages.
PCT/US2014/042552, International Preliminary Report on Patentability, dated Jan. 28, 2016, 9 pages.

* cited by examiner

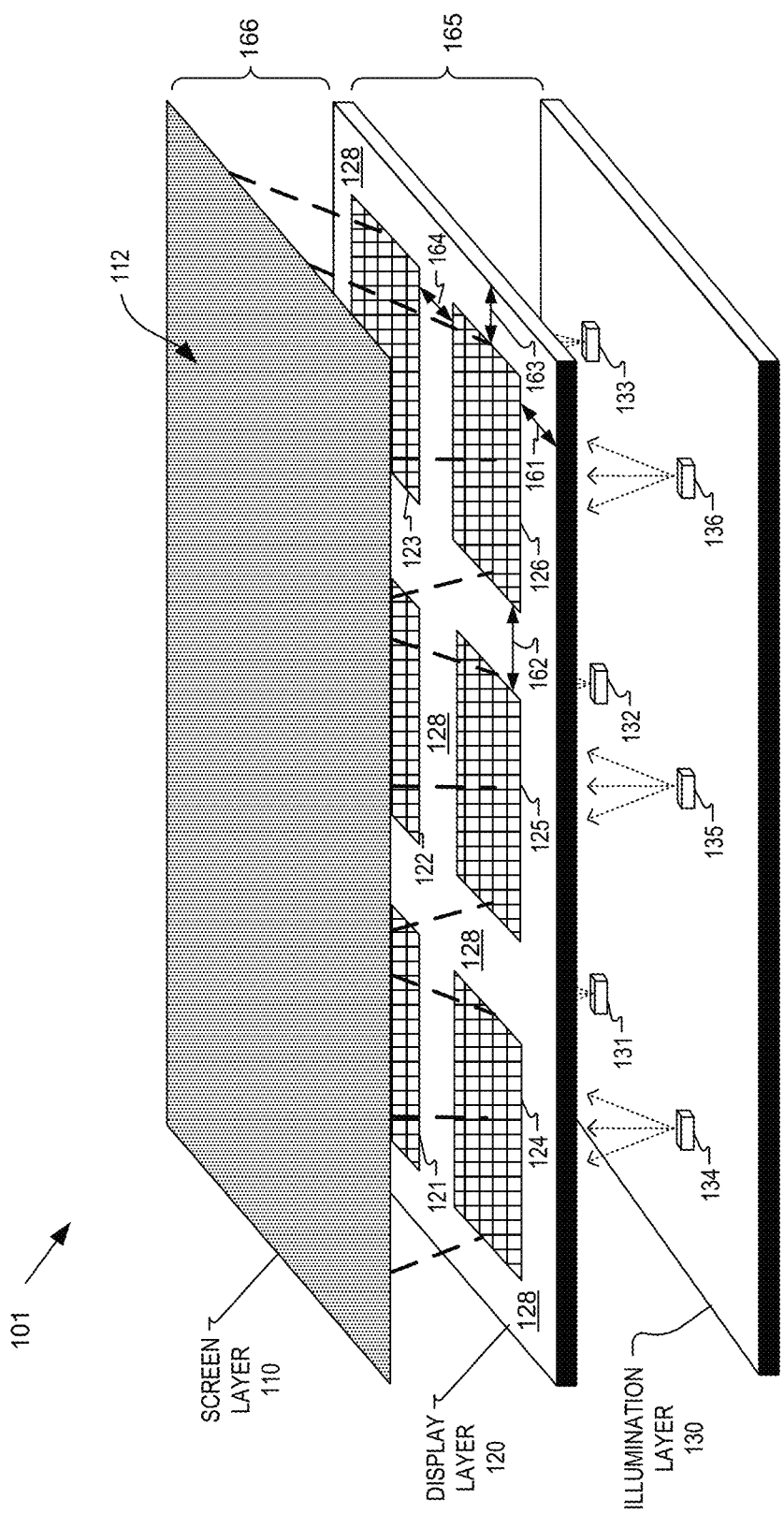

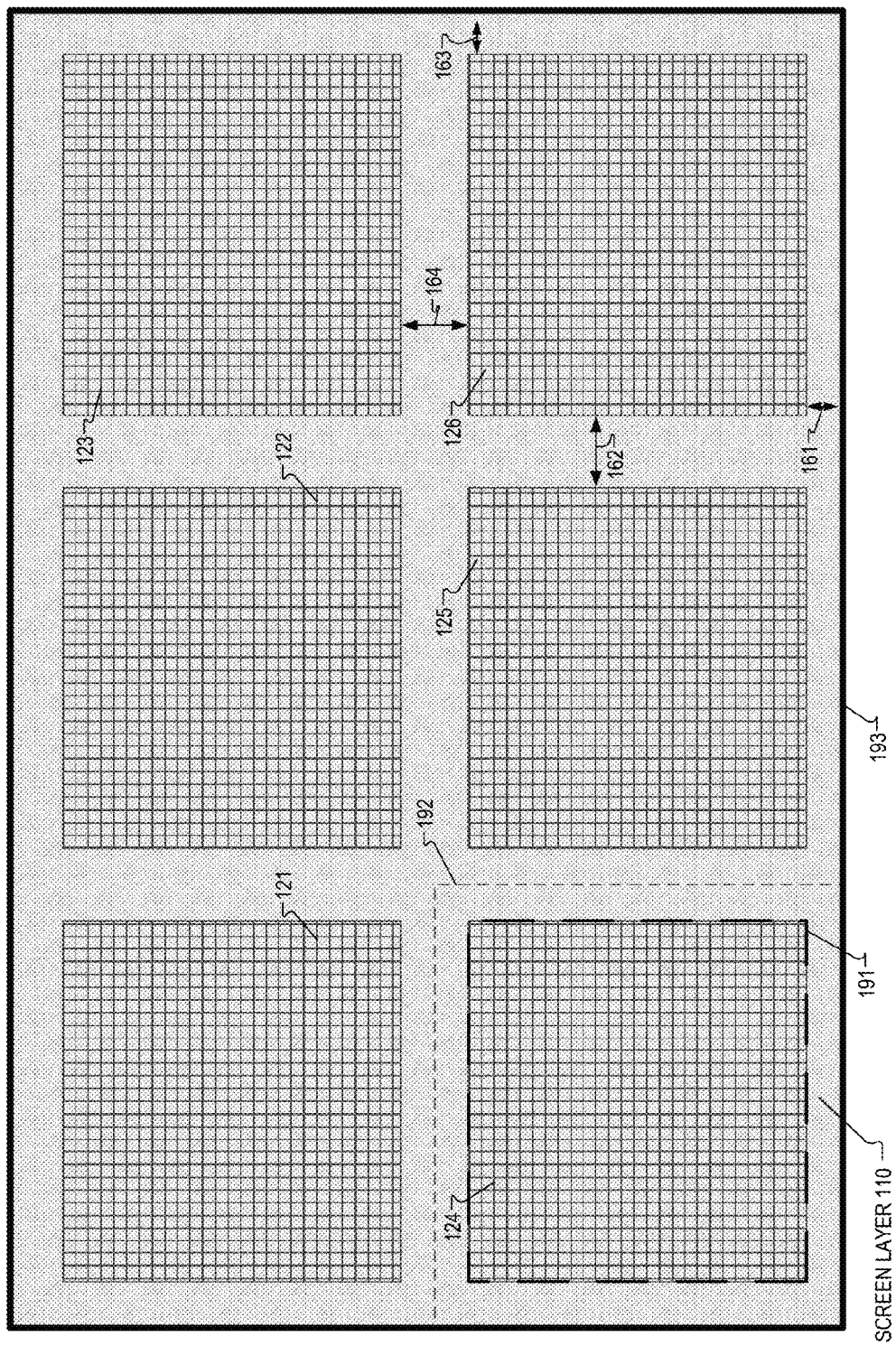

CONFIGURATIONS FOR TILEABLE DISPLAY APPARATUS WITH MULTIPLE PIXEL ARRAYS

CROSS-REFERENCE TO RELATED APPLICATIONS

This application is a divisional under 35 U.S.C. §120 of U.S. application Ser. No. 14/145,747, filed 31 Dec. 2013 and still pending, which in turn claims priority under 35 U.S.C. §119(e) to U.S. Provisional Application No. 61/856,461, filed 19 Jul. 2013. The contents of the both the provisional and non-provisional priority applications are incorporated by reference herein in their entirety.

TECHNICAL FIELD

This disclosure relates generally to displays, and in particular, but not exclusively, relates to tileable displays.

BACKGROUND

Large displays can be prohibitively expensive because the cost to manufacture display panels increases exponentially with display area. This exponential cost increase arises from the increased complexity of large single-panel displays, the decrease in yields associated with large displays (a greater number of components must be defect-free for large displays), and increased shipping, delivery, and setup costs. Tiling smaller display panels to form larger multi-panel displays can help reduce many of the costs associated with large single-panel displays.

Tiling multiple smaller, less expensive display panels together can result in a large multi-panel display that can be used as a large wall display. The individual images displayed by each display panel can constitute a sub-portion of the larger overall image collectively displayed by the multi-panel display. While a multi-panel display can reduce costs, it has a major visual drawback. Specifically, bezel regions that surround the displays put seams or cracks in the overall image displayed by the multi-panel display. These seams are distracting to viewers and detract from the overall visual experience. Furthermore, when many high-resolution displays are used to make a large multi-panel display, the overall image is extremely high resolution, which creates bandwidth and processing challenges for driving image content (especially video) to the extremely high resolution display.

BRIEF DESCRIPTION OF THE DRAWINGS

Non-limiting and non-exhaustive embodiments are described with reference to the following figures, wherein like reference numerals refer to like parts throughout the various views unless otherwise specified.

FIGS. 1A-1C are two perspective views and a cross-sectional view, respectively, of an embodiment of a display apparatus that includes a display layer disposed between a screen layer and an illumination layer.

FIG. 2 is a semi-transparent plan view of an embodiment of a display apparatus looking through a screen layer to a display layer.

DETAILED DESCRIPTION OF THE ILLUSTRATED EMBODIMENTS

Embodiments of an apparatus and a system of tileable displays are described. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a described feature, structure, or characteristic is included in at least one embodiment. Thus, appearances of the phrases "in one embodiment" or "in an embodiment" in this specification do not necessarily all refer to the same embodiment. Furthermore, the described features, structures, or characteristics can be combined in any suitable manner in one or more embodiments.

Figure 1C:
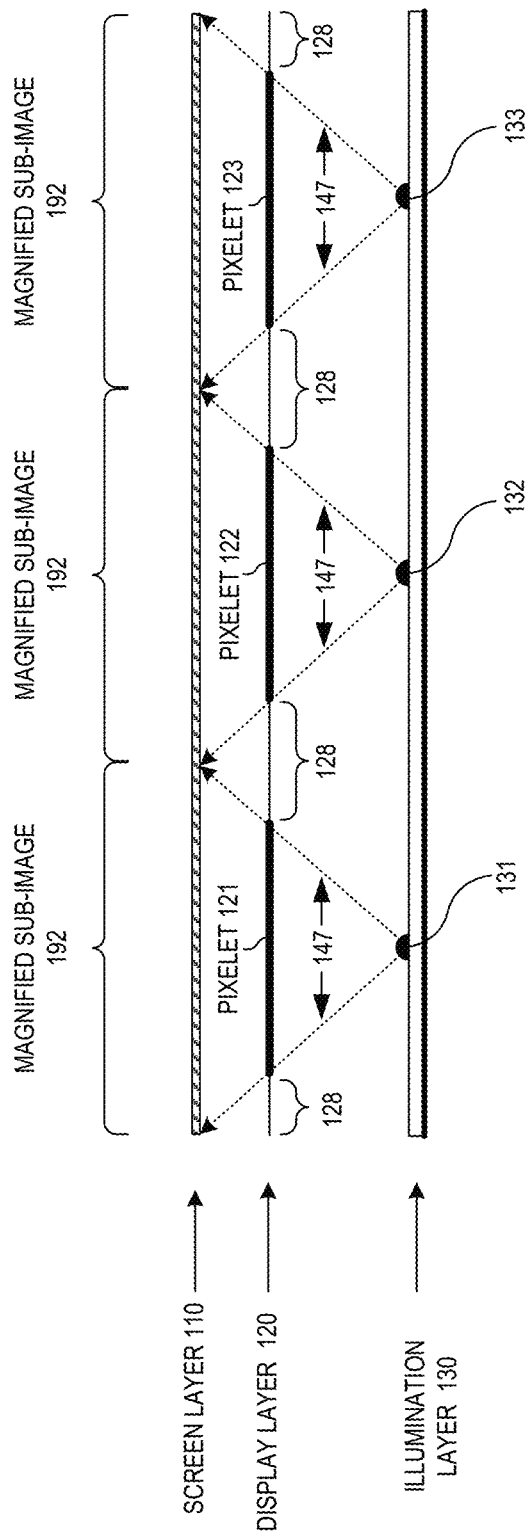

FIGS. 1A-1C illustrate an embodiment of a display apparatus 101 that includes a display layer 120 disposed between a screen layer 110 and an illumination layer 130. FIG. 1A shows that illumination layer 130 includes an array of light sources 131, 132, 133, 134, 135, and 136. Each light source in the array of light sources illuminates a corresponding pixlet to project the sub-image of the pixlet onto the screen layer 110 as a unified image. In the embodiment illustrated in FIG. 1A, each pixlet includes a transmissive pixel array arranged in rows and columns (e.g., 100 pixels by 100 pixels in one embodiment).

FIG. 1B also shows that illumination layer 130 includes light sources 131, 132, 133, 134, 135, and 136 disposed on a common plane of illumination layer 130. In one embodiment, each light source can be a laser, but in other embodiments, each light source can be a light-emitting-diode ("LED") that emits light from a relatively small emission aperture. For example, LEDs with an emission aperture of 150-300 microns can be used. The LED can emit white light. In still other embodiments, other technologies can be used as light sources. In one embodiment, each light source is an aperture emitting light from a light integration cavity shared by at least one other light source.

Display layer 120 includes a matrix of pixlets 121, 122, 123, 124, 125, and 126. The illustrated embodiment is a 2×3 matrix of pixlets 121-126, but other display layers can have different numbers and/or arrangements of pixlets. In the illustrated embodiment, each pixlet in the matrix of pixlets is oriented on a common plane of display layer 120. The pixlets can be liquid-crystal-displays ("LCDs") that can be color LCDs or monochromatic LCDs. In one embodiment, each pixlet is an independent display array separated from adjacent pixlets by spacing region 128. In one embodiment, each pixlet measures 20×20 mm. The pitch between each pixlet in the matrix can be the same. In other words, the distance between a center of one pixlet and the center of its adjacent pixlets can be the same distance. In the illustrated embodiment, each light source in the array of light sources has a one-to-one correspondence with a pixlet. For example, light source 131 corresponds to pixlet 121, light source 132 corresponds to pixlet 122, light source 133 corresponds to pixlet 123, and so on. Also in the illustrated embodiment, each light source is centered under its respective corresponding pixlet.

Display layer 120 also includes spacing region 128 surrounding pixlets 121-126. In FIG. 1B, pixlet 126 is adjacent to pixlets 123 and 125. Pixlet 126 is spaced by dimension 162 from pixlet 125 and spaced by dimension 164 from pixlet 123. Dimensions 162 and 164 can be considered "internal spacing" and need not be the same distance, but are the same in some embodiments. Pixlet 126 is also spaced by dimensions 161 and 163 from edges of display layer 120. Dimensions 161 and 163 can be considered "external spacing" and need not be the same distance, bur are the same in some embodiments. In one embodiment, dimensions 161 and 163 are half of dimensions 162 and 164; in one example, dimensions 161 and 163 are both 2 mm and dimensions 162 and 164 are both 4 mm. In the illustrated embodiment, the internal spacing between pixlets is substantially greater than the pixel pitch (space between pixels) of pixels included in each pixlet.

Spacing region 128 contains a backplane region that includes pixel logic for driving the pixels in the pixlets. One potential advantage of the architecture of display apparatus 101 is increasing space for additional circuitry in the backplane region. In one embodiment, the backplane region is used for memory-in-pixel logic. Giving the pixels memory can allow each pixel to be refreshed individually instead of refreshing each pixel in a row at every refresh interval (e.g., 60 frames per second). In one embodiment, the backplane region is used to assist in imaging processing. When display apparatus 101 is used in high-resolution large format displays, the additional image processing capacity will be useful for image signal processing, for example dividing an image into sub-images that are displayed by the pixlets. In another embodiment, the backplane region is used to embed image sensors. In one embodiment, the backplane region includes infrared image sensors for sensing 3D scene data in the display apparatus' environment.

FIG. 1C illustrates a cross-section of display apparatus 101. Each light source 131-136 is configured to emit a divergent projection beam 147 having a limited angular spread that is directed toward a specific corresponding pixlet in display layer 120. In an embodiment, divergent projection beam 147 can be substantially shaped as a cone (circular aperture) or an inverted pyramid (rectangle/square aperture). Additional optics can be disposed over each light source in the array of light sources to define the limited angular spread (e.g., 20-70 degrees) and/or cross-sectional shape of divergent projection beam 147 emitted from the light sources. The additional optics (including refractive and/or diffractive optics) can also increase brightness uniformity of the display light in divergent projection beam 147 so that the intensity of divergent projection beam 147 incident upon each pixel in a given pixlet is substantially similar.

In some embodiments not illustrated in FIG. 1C, divergent projection beams 147 from different light sources can overlap upon the spacing region 128 on the backside of display layer 120. In some embodiments, each pixlet is directly illuminated solely by one divergent projection beam from its corresponding light source, which can approximate a point source. In certain embodiments, a very small percentage of light from non-corresponding light sources can become indirectly incident upon a pixlet due to unabsorbed reflections of divergent projection beams 147 from the non-corresponding light sources. Spacing regions 128 and illumination layer 130 can be coated with light absorption coatings to decrease reflections from non-corresponding light sources from eventually becoming incident upon a pixlet that does not correspond with the light source. The limited angular spread of the light sources can be designed to ensure that divergent projection beams 147 only directly illuminates the pixlet that corresponds to a particular light source. In contrast, conventional LCD technology utilizes lamps (e.g., LEDs or cold-cathode-fluorescents) with a generally Lambertian light distribution and diffusive filters in an attempt to generate uniform and diffuse light for backlighting an LCD panel.

In operation, display light in a divergent projection beam 147 from a light source (e.g., light source 131) propagates toward its corresponding pixlet (e.g., pixlet 121). Each pixlet drives its pixels to display a sub-image on the pixlet so the display light that propagates through the pixlet includes the sub-image displayed by the pixlet. Since the light source generates the divergent projection beam 147 from a small aperture and the divergent projection beam 147 has a limited angular spread, the sub-image in the display light gets larger as it gets further away from the pixlet. Therefore, when the display light (including the sub-image) encounters screen layer 110, a magnified version of the sub-image is projected onto a backside of screen layer 110.

Screen layer 110 is offset from pixlets 121-126 by a fixed distance 166 to allow the sub-images to become larger as the display light (in divergent projection beams 147) propagates further from the pixlet that drove the sub-image. Therefore, fixed distance 166 can be one component of how large the magnification of the sub-images is. In one embodiment, fixed distance 166 is 2 mm. In one embodiment, each sub-image generated by pixlets 121-126 is magnified by 1.5×. In some embodiments each sub-image generated by each pixlets 121-126 is magnified by 1.05-1.25×. The offset by fixed distance 166 can be achieved by using a transparent intermediary (e.g., glass or plastic layers).

In one embodiment, screen layer 110 is fabricated of a matte material suitable for rear projection that is coated onto a transparent substrate that provides the offset by fixed distance 166. The backside of screen layer 110 is opposite a viewing side 112 of screen layer 110. Screen layer 110 can be made of a diffusion screen that presents the unified image on the viewing side 112 of screen layer 110 by scattering the display light in the divergent projection beams 147 (that includes the sub-images) from each of the pixlets 121-126. Screen layer 110 can be similar to those used in rear-projection systems.

FIG. 2 shows a semi-transparent plan view of an embodiment of a display apparatus 101 looking through screen layer 110 to display layer 120. Display apparatus 101 can generate a unified image 193 using magnified sub-images 192 generated by light sources 131-136 and their corresponding pixlets 121-126. In FIG. 2, pixlet 124 generates a sub-image 191 that is projected (using the display light in the divergent projection beam 147 from light source 134) onto screen layer 110 as magnified sub-image 192. Although not illustrated, each pixlet 121, 122, 123, 125, and 126 can also project a magnified sub-image onto screen layer 110 that is the same size as magnified sub-image 192. These five magnified sub-images, combined with magnified sub-image 192, form unified image 193. And because the geometric alignment of the magnified sub-images would leave virtually no gap (if any) between the magnified sub-images, unified image 193 will be perceived as seamless by a viewer. The magnified sub-images on the backside of the screen layer 110 combine laterally to form unified image 193. Magnification of the sub-images allows the unified image to reach the edge of screen layer 110, while display layer 120 and illumination layer 130 can still include a mechanical bezel that offers rigidity and support for electrical connections, but that is out of sight to a viewer of display apparatus 101.

In FIG. 2, the magnified sub-images would each be the same size and be square-shaped. To generate same-sized magnified sub-images, display layer 120 and its pixlets 121-126 can be offset from light sources 131-136 by a fixed dimension 165, as shown in FIG. 1. In one embodiment, dimension 165 is 8 mm. While FIGS. 1A-1C do not illustrate intervening layers between the layers 110, 120, and 130, it should be appreciated that embodiments can include various intervening optical and structural layers, such as lens arrays, optical offsets, and transparent substrates to provide mechanical rigidity.

Figure 3:
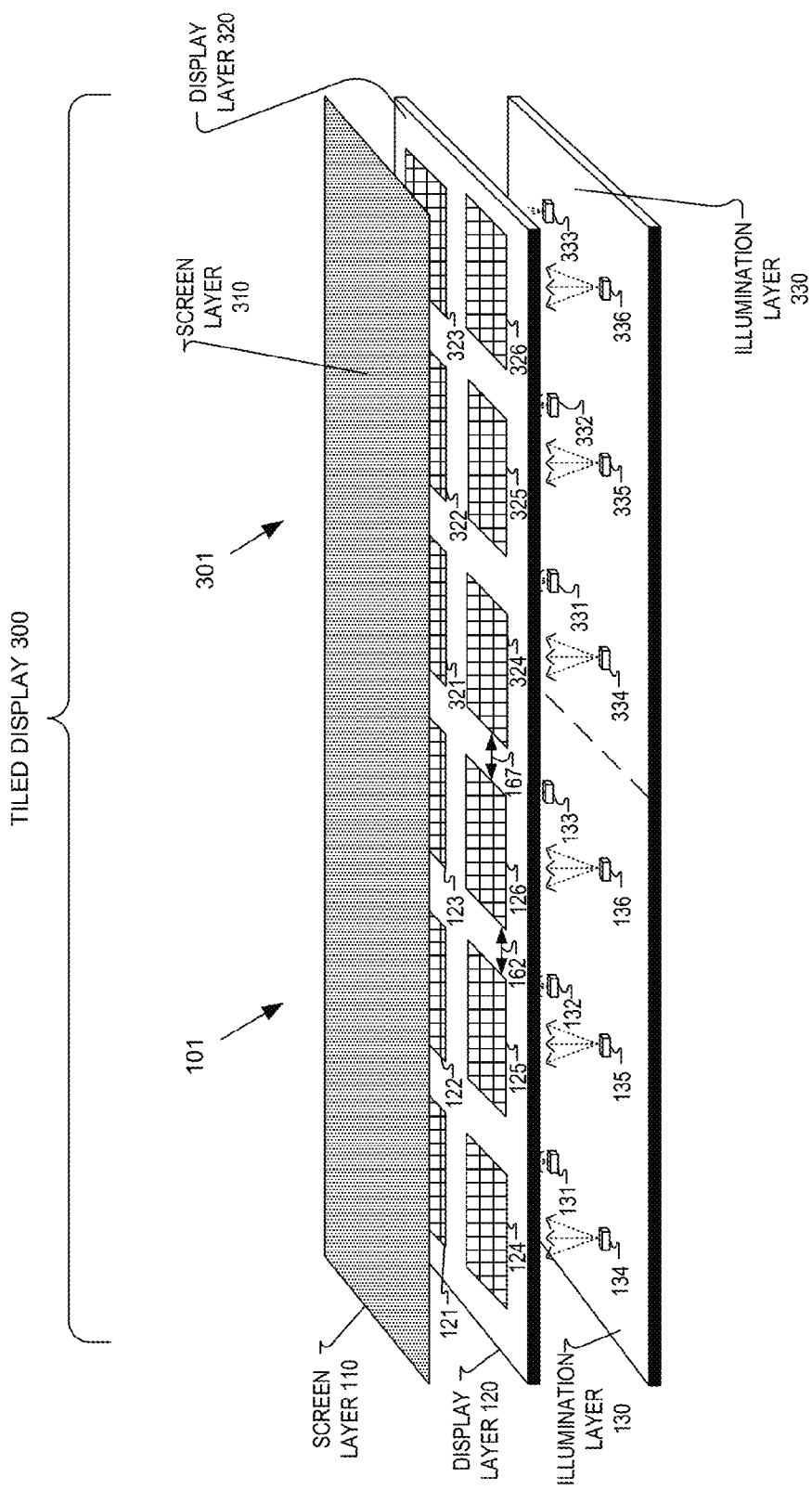
FIG. 3 shows an embodiment of a tiled display formed of more than one display apparatus tiled together.

FIG. 3 shows a pair of display apparatuses 101 and 301 tiled together to form an embodiment of a tiled display 300. Tiled display 300 displays an overall image that is a combination of a unified image (e.g., unified image 193) projected by display apparatus 101 and a unified image projected by display apparatus 301. In the illustrated embodiment, display apparatus 301 is substantially the same as display apparatus 101, but different reference numbers are used for discussion. Display apparatus 101 can be tiled together with other display apparatuses in a modular approach to building tiled display 300. In one embodiment, a self-healing adhesive is applied between screen layer 110 and screen layer 310. This adhesive will blend screen layer 110 and screen layer 310 to hide easily perceived seams between screen layers 110 and 310 in tiled display 300. In one embodiment, the self-healing adhesive is made of polymers. In another embodiment, a monolithic screen layer is disposed over display layer 120 and 320 so that the screen layer does not have a seam. Monolithic screen layers with appropriate mechanical fixtures can be sized to common tiled arrangements of multiple display apparatus 101 (e.g., 2×2, 3×3, 4×4). Third and fourth display apparatus that are the same as display apparatus 101 could be added to tiled display 300 to form a larger tiled display that is a 2×2 matrix of display apparatus 101 and that the larger display could have the same potential advantages as explained in association with tiled display 300. Of course, displays larger than a 2×2 matrix can also be formed.

In FIG. 3, dimension 167 is the same distance as dimension 162. This maintains the pitch between pixlets 126 and 324, as illustrated, and ensures that the edge of the magnified sub-image generated by light source 334 and pixlet 324 geometrically aligns with the edge of the magnified sub-image generated by light source 136 and pixlet 126. Similarly, the edge of the magnified sub-image generated by light source 331 and pixlet 321 geometrically aligns with the edge of the magnified sub-image generated by light source 133 and pixlet 123. In this way, the unified image projected on screen layer 310 aligns with the unified image projected on screen layer 110 to form the overall image displayed by tiled display 300.

Because the magnified sub-images, and therefore the unified images, of display apparatuses 101 and 301 are aligned at their edges on screen layer 110/310, the pixel pitch and density of the overall image can remain the same, even where display apparatuses 101 and 301 are coupled together. Hence, where traditional tiled displays have a distracting bezel where two display layers are coupled together, tiled display 300 can have an unperceivable seam because of the near-seamless visual integration of the unified images as the overall image on tiled display 300.

In some embodiments (not shown), mechanical structures can be added to each display apparatus 101 to facilitate the correct physical alignment of additional display apparatus. In one embodiment, electrical connectors that facilitate power and image signals are included in display apparatus 101 to facilitate modular construction of a tiled display using the display apparatus 101.

Figure 4A:
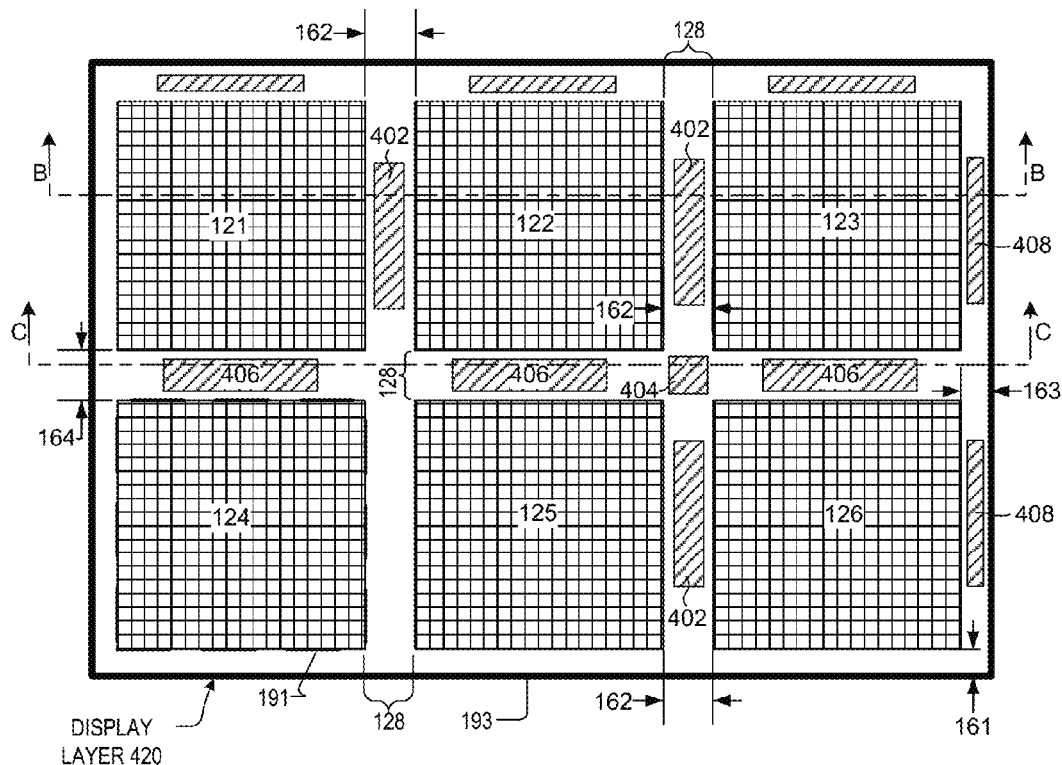
FIG. 4A is a plan view of an embodiment of a display layer that includes components positioned in its spacing region.
Figure 4B:
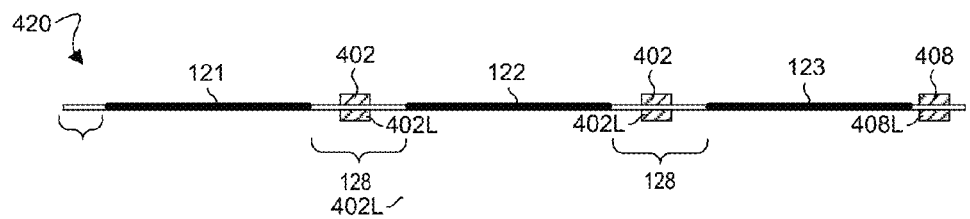
FIGS. 4B-4C are cross-sectional views of the embodiment of FIG. 4A, taken substantially along section lines B-B and C-C, respectively.
Figure 4C:
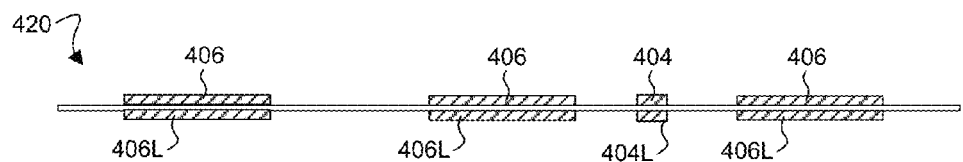

FIGS. 4A-4C illustrate an embodiment of a display layer 420 that includes components positioned on the display layer in the spacing region 128 between pixlets. FIG. 4A is a plan view, FIGS. 4B-4C cross-sectional views taken substantially along section lines B-B and C-C in FIG. 4A. Display panel 420 is an example of a display panel that could be used as display panel 120 in embodiments of display apparatus 101 and/or tiled display 300. In display panel 420, one or more components can be positioned on the display layer in all or parts of the spacing region between pixlets to support or enhance the function of the pixlets, or to provide additional functions for the pixlets individually or for the display apparatus or tiled display.

Components can be positioned in different locations on the display layer, and can take up some or all of spacing region 128. In the illustrated embodiment, components 402 are positioned in the vertically-running parts of spacing region 128, so that components 402 are positioned between pixlets 122 and 123 as well as between pixlets 125 and 126. Components 406 are positioned in the horizontally-running parts of spacing region 128, for example between pixlets 122 and 125, as well as between pixlets 123 and 126. Component 404 can be positioned at the vertices of the pixlets or, put differently, between diagonally-opposed pixlets. Thus component 404 in the illustrated embodiment is positioned at the vertices of pixlets 122, 123, 125, and 126. Components 408 can also be positioned between pixlets and one or more edges of display layer 420, although distances 161 and/or 163 in some embodiments are less than distances 162 and/or 164, so that there is less space for components 408.

As shown in FIGS. 4B-4C, components can be positioned on one or both sides of display layer 420. In the illustrated embodiments, components 402, 404, 406, and 408 are on one side of display layer 420, while components 402L, 404L, 406L, and 408L are positioned on another side of the display layer. Components on opposite sides of the display layer need not be in exactly the same position (e.g., component 402L need not be vertically aligned with component 402), nor need they be related components; for example, component 402 and component 402L can perform different or unrelated functions. The positioning of a particular component in the spacing region—whether between pixlets, at the vertices of the pixlets, or on one or both sides of the display layer—can depend on the particular component, what other on-layer or off-layer components it must be coupled to, its signal and power routing requirements, and to what pixlets, if any, it must be coupled.

Components 402-408 can be any of various types of components. In one embodiment, they can be components that support or enhance the basic operation of pixlets on display layer 420, but in other embodiments they can provide additional functionality to the display apparatus or tiled display. In one embodiment components 402-408 can all be of the same type, but in other embodiments components with different functions can be positioned on the same display layer; that is, on the same display layer some of the components may support pixlet, while others provide additional functionality. Non-limiting examples of possibilities for components 402-408 can include electronic circuitry, sensors, transducers, or other components.

Various types of electronic components can be mounted on display layer 420 to support or enhance pixlet functions. Examples can include memory, logic circuitry, driving circuitry for the pixlets or other components, repeaters, and the like (see, e.g., FIG. 6).

Various types of sensors can be mounted on display layer 420 to provide additional functions to the display. Sensors and related components that can be mounted on display layer 420 include:

- One or more optical sensors within the visible wavelengths or outside the visible wavelengths, such as infrared or ultraviolet, for example to sense 3D scene data in the display apparatus' environment.
- One or more cameras, for example to allow a user of a display to control with the display with facial or gesture recognition. Cameras can also allow eye tracking of a user's eyes to assess what part of the display they are looking at any given time.
- One or more touch screen sensors, for example to allow a user to interact with the display apparatus via touch.
- Sensor support elements, such as controllers, processors, drivers, memories, power supplies, and so on, can also be positioned on the display layer along with the sensors themselves.
- Other sensors not listed.

In situations in which the sensors on display layer 420 can collect, determine, and/or make use of personal information about users, the users can be provided with an opportunity to control whether programs or features collect and/or determine user information (e.g., information about a user's social network, social actions or activities, profession, a user's preferences, or a user's current location), and/or an opportunity to control whether and/or how to receive content from the content server that may be more relevant to the user. In addition, certain data can be processed in one or more ways before it is stored or used, so that personally identifiable information is removed. For example, a user's identity may be processed so that no personally identifiable information can be determined for the user, or a user's geographic location may be generalized where location information is obtained (such as to a city, ZIP code, or state level), so that a user's particular location cannot be determined. Thus, the user may have control over how information is collected about the user and used by a content server.

Various types of transducer can be mounted on display layer 420 to provide additional functions to the display. Transducers and related components that can be mounted on display layer 420 include:

- One or more microphones, for example to allow a user of the display to interact with or control the display apparatus by voice, or to allow use of the display apparatus for videoconferencing so that the users can talk with other users without the need for separate microphones.
- One or more speakers, for example to allow users of the display to hear audio associated with images on the display, to allow users to conference videoconference with other users of similar displays, and so on.
- One or more solar panels (see FIG. 7), for example to provide power for the pixlets or other circuitry in the display, or at least to offset some of the power consumption of the display.
- One or more antennas, for example to allow wireless communication to or from the display apparatus.
- Transducer support elements such as controllers, processors, drivers, memories, power supplies, and so on, can also be positioned on the display layer along with the transducers themselves.
- Other transducers not listed.

Figure 5:
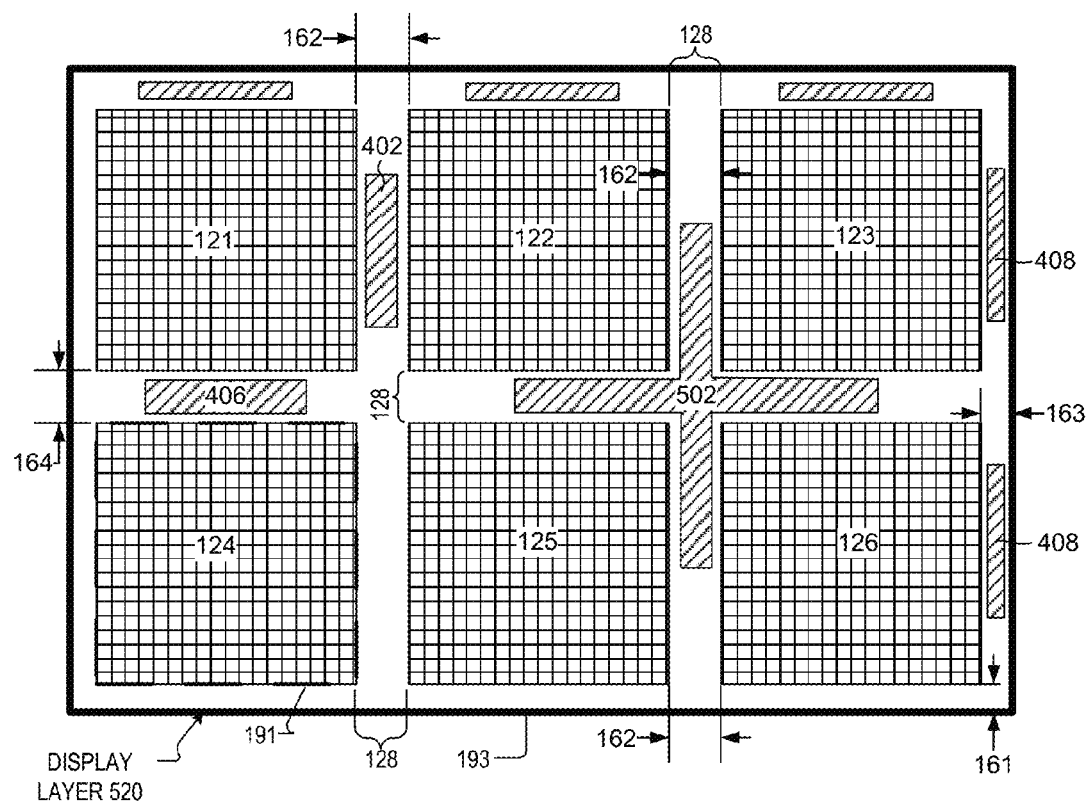
FIG. 5 is a plan view of another embodiment of a display panel that includes components positioned in the spacing region.

FIG. 5 illustrates an embodiment of a display panel 520 that also includes components positioned in the spacing region between pixlets. The components can support or enhance the function of the pixlets, or provide additional functions to the pixlets individually or to the display apparatus or tiled display as a whole. Display panel 520 is also an example of a display panel that could be used as display panel 120 in embodiments of display apparatus 101 and/or tiled display 300.

Display layer 520 is similar in most respects to display layer 420. It includes one or more components that can be positioned in all or parts of the spacing region 128. The primary difference between display layer 520 and 420 is that in display layer 520 component 502 is shaped to occupy all or part of both the spacing region between pixlets and the spacing region at the vertices of the pixlets. Component 502 can be positioned in the vertically-running portion of spacing region 128, between pixlets 122 and 123 and between pixlets 125 and 126, and also in the horizontally-running spacing region between pixlets 122 and 126 and between pixlets 123 and 126. Component 502 is also positioned at the vertices of the pixlets 122, 123, 125, and 126, between diagonally-opposed pixels. As with previously-described components, component 520 can be on one or both sides of display layer 520. The illustrated positioning can be useful if a single component must service a cluster of two or more pixlets. In other embodiments, use of a component shaped in position such as component 502 does not preclude use of additional components positioned, for example, as shown in FIGS. 4A-4C.

Figure 6:
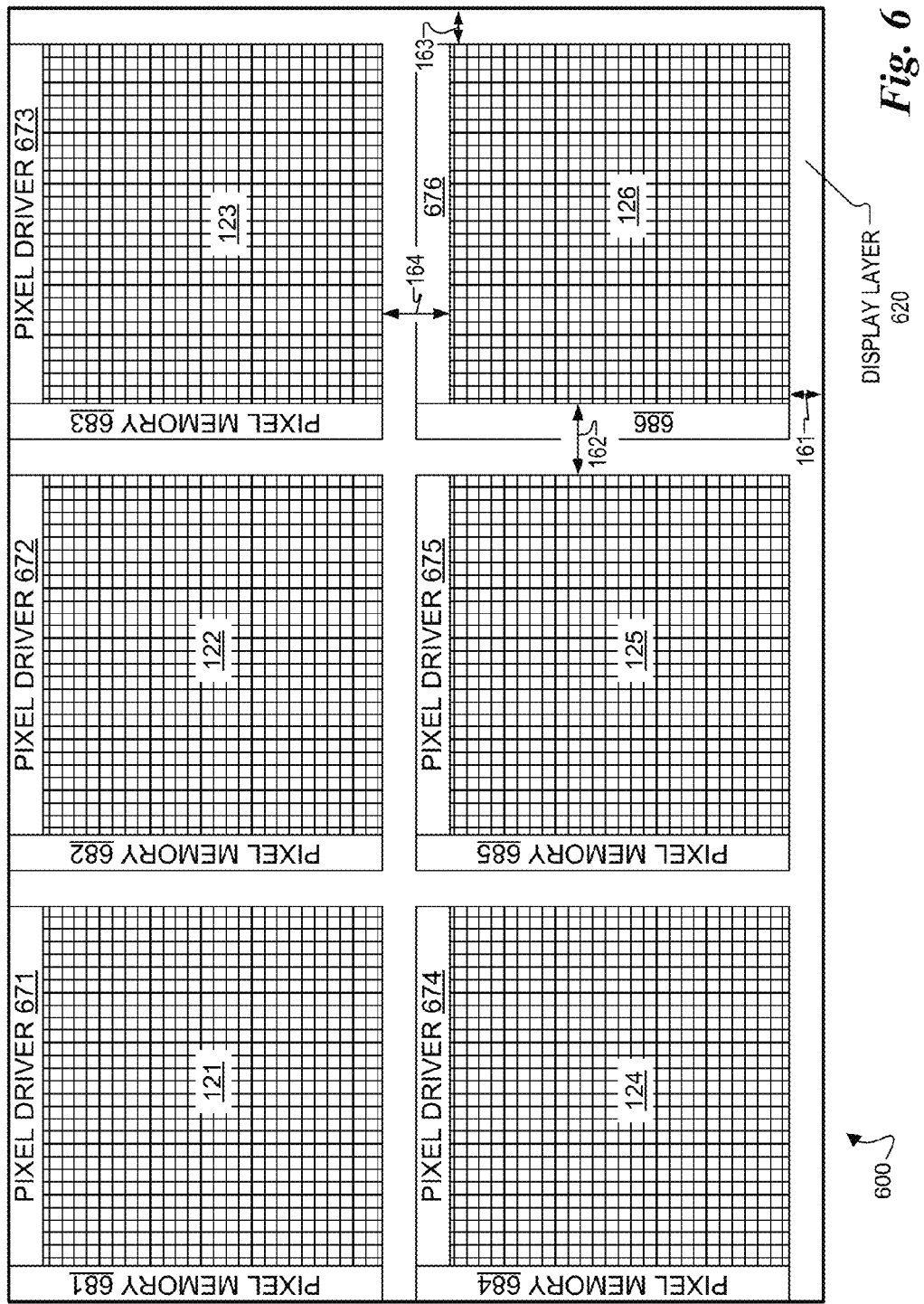
FIG. 6 is a plan view of another embodiment of a display panel that includes components positioned in the spacing region.

FIG. 6 illustrates an embodiment of a display panel 620 that includes pixel arrays 121-126 having local pixel drivers and local pixel memory. Display panel 620 is an example display panel that could be used as display panel 120 in embodiments of display apparatus 101 and/or tiled display 300.

Since the pixels in display apparatus 101 are grouped as pixlets rather than one large pixel array, spacing region 128 can be used to add additional logic to spacing region 128. In conventional pixel arrays that are one large pixel array, the aperture of the pixels size is quite small. In some cases the aperture is only about 30% of the pixel size. This small aperture is partly due to the extensive wiring and transistors that are built into the pixels. But with the pixel arrays broken out into pixlets, there is room in spacing region 128 to put logic that traditionally must be in the pixel (or running to an adjacent pixel), while still remaining relatively local to the pixels the logic is driving. FIG. 6 shows that pixel drivers 671-676 are located locally along the edge of each pixlet 121-126. With local pixel drivers, it is possible to individually turn off "zones" of display panel 620. In one embodiment one or more of the pixlets 121-126 is turned off in response to an input. In one embodiment, a pixlets 121-126 is turned off in response to a touch screen input that overlays top screen 110 to mitigate electromagnetic-interference ("EMI"). Having local pixel drivers 671-676 can allow for small transistors, logic, wire width, and capacitors that drive the pixels because the signal lines will be shorter than in a traditional large monolithic pixel array.

Spacing region 128 can also be used to add additional logic such as pixel memories 481-486. These local pixel memories can allow each pixel to retain its value so that every pixel in each pixlet need not be refreshed every refresh interval (e.g., 60 frames per second). In one embodiment (not shown), a backplane region in spacing region 128 is used to include processing logic to assist in imaging processing. When display apparatus 101 is used in high-resolution large-format displays, the additional image processing capacity will be useful for image signal processing, for example dividing an image into sub-images that are displayed by the transmissive pixlets.

Figure 7:
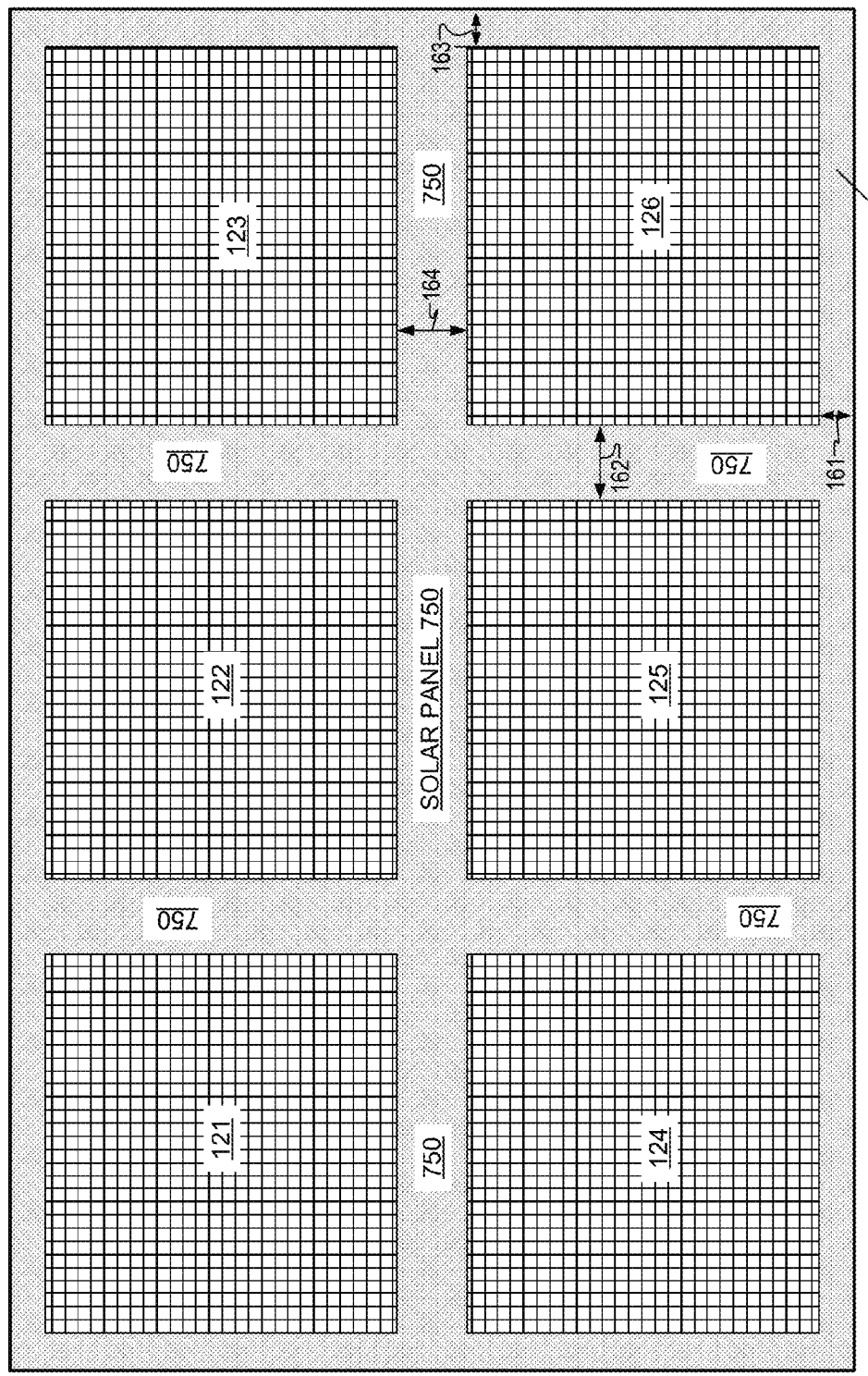
FIG. 7 is a plan view of an embodiment of a display panel that includes a solar panel disposed in the spacing region.

FIG. 7 shows a display panel 720 that includes a solar panel 750 disposed in the entire spacing region between pixlets 121-126. Solar panel 750 can be configured to power pixel arrays 121-126 to help reduce the energy consumption of display apparatus 101. Display panel 720 is an example display panel that could be used as display panel 120 in embodiments of display apparatus 101 and/or tiled display 300. Display panel 720 is an example display panel that could be used as display panel 120 in embodiments of display apparatus 101 and/or tiled display 300.

The above descriptions of embodiments of the invention, including what is described in the abstract, is not intended to be exhaustive or to limit the invention to the disclosed forms. Specific embodiments of, and examples for, the invention are described herein for illustrative purposes, but various modifications are possible within the scope of the invention, as those skilled in the relevant art will recognize.

These modifications can be made to the invention in light of the above detailed description. The terms used in the claims that follow should not be interpreted to limit the invention to the specific embodiments disclosed in the specification. Rather, the scope of the invention should be determined entirely by the following claims, construed in accordance with established legal doctrines of claim interpretation.

The invention claimed is:

1. A display apparatus comprising:
   a screen layer for displaying a unified image to a viewer on a viewing side of the screen layer that is opposite a backside of the screen layer;
   an illumination layer having an array of light sources, wherein each light source in the array is configured to emit a divergent projection beam having a limited angular spread; and
   a display layer disposed between the screen layer and the illumination layer, the display layer comprising:
      a matrix of pixlets;
      a spacing region disposed between the pixlets in the matrix; wherein the array of light sources is positioned to emit the divergent projection beams having limited angular spread to project sub-images displayed by the pixlets as magnified sub-images on the backside of the screen layer, the magnified sub-images to combine to form the unified image that is substantially seamless, and
      one or more components positioned on the display layer in the spacing region, wherein the one or more components includes a single electronic component having a cross shape that is mounted in both a vertically-extending portion and a horizontally-extending portion of the spacing region between adjacent pixlets.

2. The display apparatus of claim 1 wherein the pixlets are offset from the light sources in the array of light sources by a second fixed distance.

3. The display apparatus of claim 1 wherein an internal spacing between each adjacent pixlet in the matrix is a first dimension and wherein an external spacing between edges of the display layer and edges of the pixlets is a second dimension that is half of the first dimension.

4. The display apparatus of claim 1 wherein the one or more components are positioned on one side of the display layer or wherein the one or more components are positioned on both sides of the display layer.

5. The display apparatus of claim 1 wherein the one or more components are positioned in a part of the spacing region between adjacent pixlets.

6. The display apparatus of claim 1 wherein the one or more components are positioned in a part of the spacing region between diagonally opposed pixlets.

7. The display apparatus of claim 1 wherein the one or more components include electronic components that support the pixlets.

8. The display apparatus of claim 7 wherein the electronic components can include driver circuitry and/or memory.

9. The display apparatus of claim 1 wherein the one or more components can include sensors or transducers.

10. The display apparatus of claim 9 wherein the sensors can include electronic sensors, optical sensors, infrared sensors, cameras, eye-tracking cameras, or touch sensors.

11. The display apparatus of claim 9 wherein the transducers can include microphones, speakers, antennas, or solar panels.

12. A multi-panel display comprising:
    a plurality of tileable displays arranged to form the multi-panel display, each tileable display comprising:
       a screen layer for displaying a unified image to a viewer on a viewing side of the screen layer that is opposite a backside of the screen layer;
       an illumination layer having an array of light sources, wherein each light source in the array is configured to emit a divergent projection beam having a limited angular spread; and
       a display layer disposed between the screen layer and the illumination layer, the display layer comprising:
          a matrix of pixlets;
          a spacing region disposed between the pixlets in the matrix;
          wherein the array of light sources are positioned to emit the divergent projection beams having limited angular spread to project sub-images displayed by the pixlets as magnified sub-images on the backside of the screen layer, the magnified sub-images to combine to form the unified image that is substantially seamless, and
          wherein the unified images from each tileable display combine to form an overall image displayed by the multi-panel display; and
          one or more components positioned on the display layer in the spacing region, wherein the one or more components includes a single electronic component having a cross shape that is mounted in both a vertically-extending position and a horizontally-extending position of the spacing region between adjacent pixlets.

13. The multi-panel display of claim 12 wherein the one or more components are positioned on one side of the display layer or wherein the one or more components are positioned on both sides of the display layer.

14. The multi-panel display of claim 12 wherein the one or more components are positioned in a part of the spacing region between adjacent pixlets.

15. The multi-panel display of claim 12 wherein the one or more components are positioned in a part of the spacing region between diagonally opposed pixlets.

16. The multi-panel display of claim 12 wherein the one or more components include electronic components that support the pixlets.

17. The multi-panel display of claim 16 wherein the electronic components can include driver circuitry and/or memory.

18. The multi-panel display of claim 12 wherein the one or more components can include sensors or transducers.

19. The multi-panel display of claim 18 wherein the sensors can include electronic sensors, optical sensors, infrared sensors, cameras, eye-tracking cameras, or touch sensors.

20. The multi-panel display of claim 18 wherein the transducers can include microphones, speakers, antennas, or solar panels.

* * * * *